United States Patent
Thomson et al.

(10) Patent No.: US 6,501,474 B1
(45) Date of Patent: Dec. 31, 2002

(54) METHOD AND SYSTEM FOR EFFICIENT RENDERING OF IMAGE COMPONENT POLYGONS

(75) Inventors: John S. Thomson, Santa Clara, CA (US); James T. Battle, San Jose, CA (US)

(73) Assignee: ATI International SRL, West Indies (BB)

( * ) Notice: Subject to any disclaimer, the term of this patent is extended or adjusted under 35 U.S.C. 154(b) by 0 days.

(21) Appl. No.: 09/451,191

(22) Filed: Nov. 29, 1999

(51) Int. Cl.$^7$ .............................................. G06T 11/20
(52) U.S. Cl. ...................... 345/441; 345/581; 345/619
(58) Field of Search ............................... 345/429, 430, 345/441, 581, 619

(56) References Cited

U.S. PATENT DOCUMENTS 5,777,623 A * 7/1998 Small .......................... 345/430

* cited by examiner

Primary Examiner—Michael Razavi
Assistant Examiner—Motilewa Good-Johnson
(74) Attorney, Agent, or Firm—Vedder, Price, Kaufman & Kammholz

(57) ABSTRACT

A graphics processing system includes an initial processing system that receives a command to render an image component polygon and generates parameters for calculating image values for the image component polygon. The graphics processing system also includes a backtrack register capable of storing a pixel location. A rasterization engine scans a pixel span in a selected direction and determines whether the pixel span is to be scanned in a direction opposite the selected direction. The rasterization engine stores a backtrack location in the backtrack register in response to a determination that the pixel span is to be scanned in a direction opposite the selected direction, and stores a location to begin scanning a subsequent pixel span in the backtrack register in response to a determination that a backtrack location is not stored in the backtrack register. The rasterization engine also calculates image values for each pixel in the pixel span in the current scan direction. A pixel data processing system receives the image values from the rasterization engine and stores the image values in a frame buffer for display. The graphics processing system has increased image rendering speed without a corresponding increase in the number of logic gates or the amount of chip area required for the rasterization engine.

18 Claims, 7 Drawing Sheets

METHOD AND SYSTEM FOR EFFICIENT RENDERING OF IMAGE COMPONENT POLYGONS

TECHNICAL FIELD OF THE INVENTION

The present invention relates to three-dimensional graphics processing, and in particular to a method and system for efficient rendering of image component polygons.

BACKGROUND OF THE INVENTION

In computer graphics, the surfaces of 3-D objects are approximated using polygons (typically triangles). Using smaller polygons creates more realistic 3-D objects on the computer screens. However, using smaller polygons requires a larger number of polygons to represent an object.

Surfaces of objects and the polygons representing the surfaces are provided in a three dimensional coordinate system, typically referred to as "object space" O(x, y, z). However, graphical displays used with computers and consumer video equipment are only two-dimensional. Therefore, an image of the objects is displayed on a graphical display by projecting the object onto a two-dimensional coordinate system, typically referred to as "screen space" S(x, y).

Generally, a polygon can be described by the polygon's vertices. Typically the description of a vertex includes the coordinates of the vertex in object space, i.e. (x, y, z); perspective projection parameters (w, s, t); the color of the vertex, typically using color space coordinates (r, g, b); an alpha parameter; and a fog parameter. The vertex information is processed through well known setup processes into a parameter list suitable for a 3-D pipeline. The exact parameter list format depends on the 3-D pipeline used.

The 3-D pipeline performs rasterization of the polygons, i.e. the conversion of polygons into pixels in screen space. A common rasterization algorithm for polygons includes four major steps: walk edges, walk spans, compute texture coordinates, and compute fog value. Many elements of the theory and techniques of rasterization are known to those skilled in the art.

Texturing pixels is a technique for mapping an image ("texture") onto the polygonal surfaces of a computer-generated object, so as to allow the object to appear more realistic in a displayed scene. Texture mapping allows a texture to be superimposed onto each polygon of an object, using transformation techniques that compensate the appearance of the texture in each polygon for lighting conditions, angles of viewing and other conditions which may affect the appearance of the object. Many elements of the theory and techniques of texture mapping are known to those skilled in the art.

As screen space pixels are generated by rasterization, the screen space pixels are blended in a blender or back end processor to create 2-D images suitable for graphic displays. Specifically, the blender or back end processor performs Z-buffering and alpha blending on the screen space pixels. Z-buffering determines which screen space pixels can be seen on the graphics screen. Specifically, Z-buffering compares the z-coordinate of each screen space pixel against the z-coordinate of the screen space pixel with the same x- and y-coordinates already in the frame buffer. If the screen space pixel is in front of the frame buffer pixel, the parameters of the screen space pixel is stored in the frame buffer; otherwise the contents of the frame buffer remain unchanged. The frame buffer is typically addressed by mapping the x- and y-coordinates of a pixel into a memory address. The frame buffer stores parameters regarding the pixel such as color space values and the z-coordinate. Alpha blending controls the translucence of overlaid surfaces. The screen space pixels are stored in a frame buffer for displaying on a graphics display. Many elements of the theory and techniques of Z-buffering and alpha blending are known to those skilled in the art.

For realistic 3-D graphics, a 3-D image may include thousands of polygons for real-time applications or even millions of polygons for high-resolution 3-D images. Since many calculations are required to render each polygon, a high-quality image can consume a large amount of processor time. Thus, performance and image quality are often competing considerations due to the limited processing speeds available. Any decrease in the processing time required to render an image component polygon is desirable, since it enables either higher-quality graphics to be produced at a given frame rate or faster rendering of a given image.

SUMMARY OF THE INVENTION

Therefore, a need has arisen for a three-dimensional graphics processing system and method that address the disadvantages and deficiencies of the prior art. In particular, a need has arisen for a three-dimensional graphics processing system and method capable of efficient rasterization of an image component polygon.

Accordingly, a method for displaying an image component polygon is disclosed. In one embodiment, the method includes receiving information indicating the location of the perimeter of the image component polygon, selecting a current pixel span with a plurality of pixels, selecting a current scan direction for the current pixel span, storing a location to begin scanning the subsequent pixel span, scanning at least one pixel in the current pixel span in the current scan direction to determine whether the pixel is within the image component polygon, determining image values for each pixel in the current pixel span in the current scan direction that is within the image component polygon, storing the image values in a frame buffer for display, and scanning the subsequent pixel span from the stored location after each pixel in the current pixel span has been scanned.

In another embodiment of the present invention, a graphics processing system includes an initial processing system that receives a command to render an image component polygon and generates parameters for calculating image values for the image component polygon. The system also includes a backtrack register capable of storing a pixel location. A rasterization engine scans a pixel span in a selected direction and determines whether the pixel span is to be scanned in a direction opposite the selected direction. The rasterization engine stores a backtrack location in the backtrack register in response to a determination that the pixel span is to be scanned in a direction opposite the selected direction, and stores a location to begin scanning a subsequent pixel span in the backtrack register in response to a determination that a backtrack location is not stored in the backtrack register. The rasterization engine also calculates image values for each pixel in the pixel span in the current scan direction. A pixel data processing system receives the image values from the rasterization engine and stores the image values in a frame buffer for display.

An advantage of the present invention is that the rasterization method described herein provides an efficient process for determining which pixels are within an image component polygon, and for calculating interpolant values for those pixels which are within the image component polygon. Another advantage of the present invention is that the method reduces the amount of scanning of pixels outside the image component polygon, thereby reducing image rendering time. Yet another advantage is that, by using an existing register, the method increases image rendering speed without a corresponding increase in the number of logic gates or the amount of chip area required for the rasterization engine.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
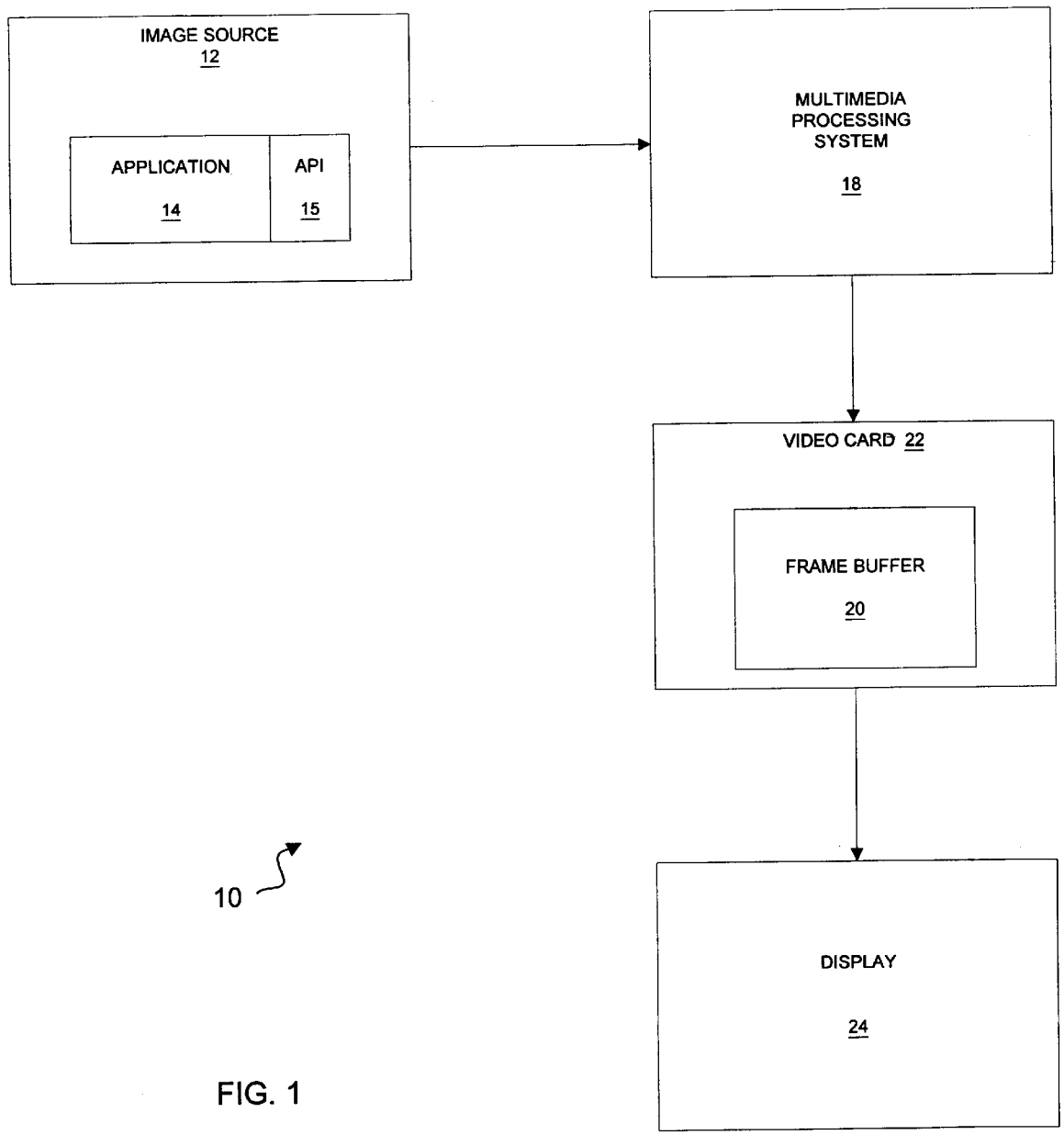
FIG. 1 is a block diagram of a graphics processing and display system.

The preferred embodiments of the present invention and their advantages are best understood by referring to FIGS. 1 though 4 of the drawings. Like numerals are used for like and corresponding parts of the various drawings.

Referring to FIG. 1, a block diagram of a graphics processing and display system 10 is shown. Graphics system 10 includes an image source 12, which generates image data in the form of image component polygons. In particular, image source 12 may be a microprocessor executing an application 14, such as a video game, that uses an application program interface 15 utilizing a 3-D library such as Direct3D™ or OpenGL™.

Image source 12 generates a series of image data sets, each representing an image component polygon such as a triangle. Thus, each image data set may include x-, y- and z-coordinates for each of the three triangle vertices, as well as color information associated with each triangle vertex. Each image data set may also include quantities such as a transparency factor (alpha) for each vertex, texture map coordinates, a fog value and a perspective correction value. Image source 12 also generates a series of commands, such as "draw triangle" commands or change state parameter commands, that are needed to create the image in question.

In generating the three-dimensional image data, image source 12 preferably performs such well-known image processing steps as coordinate transformation to account for a particular "point of view" in object space, application of lighting effects to determine diffuse and specular reflection as seen from the appropriate point of view, and clipping to eliminate off-screen image components.

The three-dimensional image data generated by image source 12 is transmitted to a multimedia processing system 18. Multimedia processing system 18 may include a graphics accelerator card or chip separate from the main microprocessor of image source 12, or may comprise a set of multimedia logic located on the same processor chip with image source 12.

Multimedia processing system 18 processes the three-dimensional image data to generate data representing a two-dimensional point-of-view image. This two-dimensional image data is stored in a frame buffer 20 on a video processing unit 22, from which a display image may be created in a conventional manner on a display system 24. Video processing unit 22 may be, for example, a commercially available SVGA video card, or some other video card, alternatively, video processing unit 22 may be integrated on the main microprocessor of image source 12.

It will be understood that frame buffer 20 may in fact comprise two frame buffers used alternately to provide an image to display system 24 using the well-known "double-buffering" technique. Display system 24 may be, for example, a personal computer monitor, a virtual reality goggle screen or some other visual display.

In order to create two-dimensional image data for frame buffer 20, multimedia processing system 18 must determine a color value or set of color values for each pixel stored in frame buffer 20. This may require interpolating colors between the vertices of an image component triangle, determining whether any given pixel is within or outside a particular image component triangle, texture mapping and resolving the occlusion of more distant image components by more proximate image components, while taking into account the transparency of nearer image components (known as alpha-blending). This processing may require many calculations for each individual pixel of the final image, and is therefore very time-consuming. Multimedia processing system 18 is designed to perform the necessary calculations quickly and efficiently.

Figure 2:
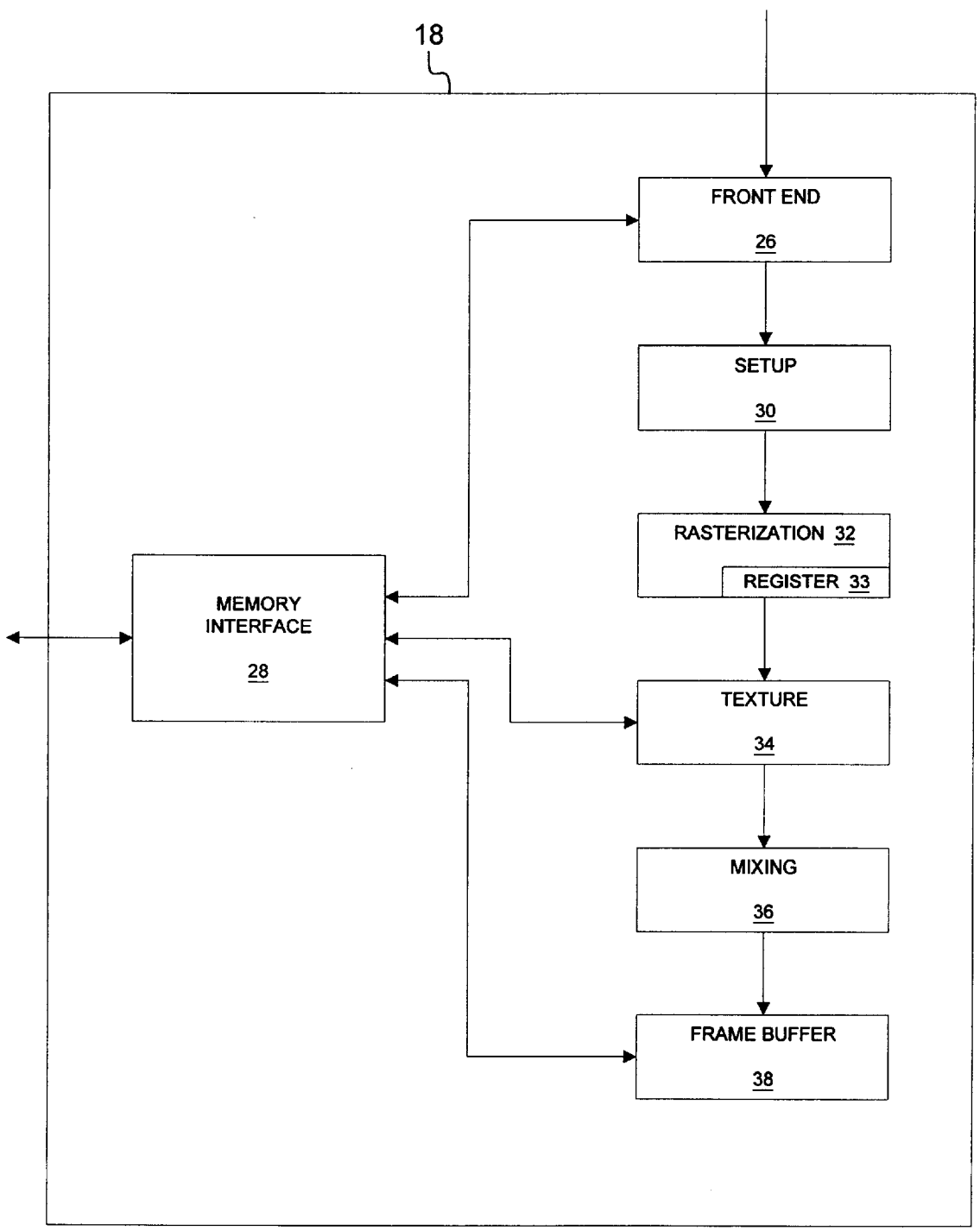
FIG. 2 is a simplified block diagram of a multimedia processing system for use in the graphics processing and display system.

Referring to FIG. 2, a simplified block diagram of multimedia processing system 18 is shown. Multimedia processing system 18 includes a front-end processor 26, which receives graphics commands from image source 12, such as a command to draw a specified image component triangle. Front-end processor 26 retrieves the triangle data from memory via a memory interface unit 28, converts variable vertex formats into a canonical format, and passes the triangle data to a setup unit 30 as a discrete data set.

Setup unit 30 receives the triangle data set from front-end processor 26 and calculates triangle parameters suitable for rasterization. Specifically, setup unit calculates interpolation parameters for each triangle parameter that is to vary continuously from vertex to vertex. For example, assuming that a diffuse red intensity value was specified for each vertex of the triangle, setup unit 30 may assume that the diffuse red intensity function varies linearly from vertex to vertex. Setup unit 30 then calculates partial derivatives of the diffuse red intensity function in the x- and y-directions, and calculates a diffuse red intensity value for an initial set of coordinates in or near the triangle. The partial derivatives, initial value and initial coordinates may be used at a later stage to calculate a diffuse red intensity value at any location within the triangle, as will be described below. Likewise, partial derivatives and initial values are calculated for other parameters to be interpolated ("interpolants"), such as specular red intensity, diffuse and specular green and blue intensity, transparency factor, texture coordinates, fog factor, z-coordinate, homogenizing factor and edge functions that are used to determine whether a particular point is inside or outside the triangle.

Setup unit 30 passes the calculated interpolant parameters to a rasterization engine 32. Rasterization engine 32 calculates a value for each interpolant at various coordinates representing pixel locations in or near the triangle, as will be described more fully below. To complete this rasterization process, rasterization engine 32 includes a backtrack state register 33, the function of which will be described below. Setup unit 30 may also pass a "greatest y-value" parameter to rasterization engine 32, indicating the y-coordinate of the lowest vertex of the image component triangle. This parameter may be used by rasterization engine 32 to determine when scanning of the image component triangle is complete, as described below. The interpolated texture coordinates (if any) calculated by rasterization engine 32 are passed to a texture unit 34, which accesses one or more texture bitmaps to determine texture values for each pixel.

The triangle data, including texture values calculated by texture unit 34 and interpolant values calculated by rasterization engine 32, are passed to a mixing unit 36, which mixes the texture values with the interpolated specular and diffuse RGB values, as well as the interpolated fog factor, to generate a stream of pixel data, in which each pixel data set includes x, y and z-coordinates, RGB values and an interpolated transparency factor.

The pixel data may be passed directly to frame buffer 20 on video processing unit 22. Alternatively, the image space in question may be divided into sections, each section having a set of pixels that is processed as described above and stored in a microframe buffer 38 prior to being passed on to frame buffer 20. While microframe buffer 38 is not necessary to practice the present invention, the ability to access microframe buffer 38 at high speeds to perform z-buffering and alpha-blending may result in increased image rendering speed.

Either microframe buffer 38 or frame buffer 20 compares the z-coordinate of each incoming pixel to the z-coordinate of the existing pixel at that x-y location (if any) to determine whether the incoming pixel should replace the existing pixel. The frame buffer in question also uses the interpolated transparency factors of the incoming pixel and the existing pixels, as appropriate, to alpha-blend the incoming pixel with the existing pixel. The frame buffer in question then stores the blended pixel data for display by display system 24. If a microframe buffer 38 is utilized, then the pixel data stored therein is transferred to frame buffer 20 after the processing of all image components intersecting the image section covered by microframe buffer 38.

Figure 3A:
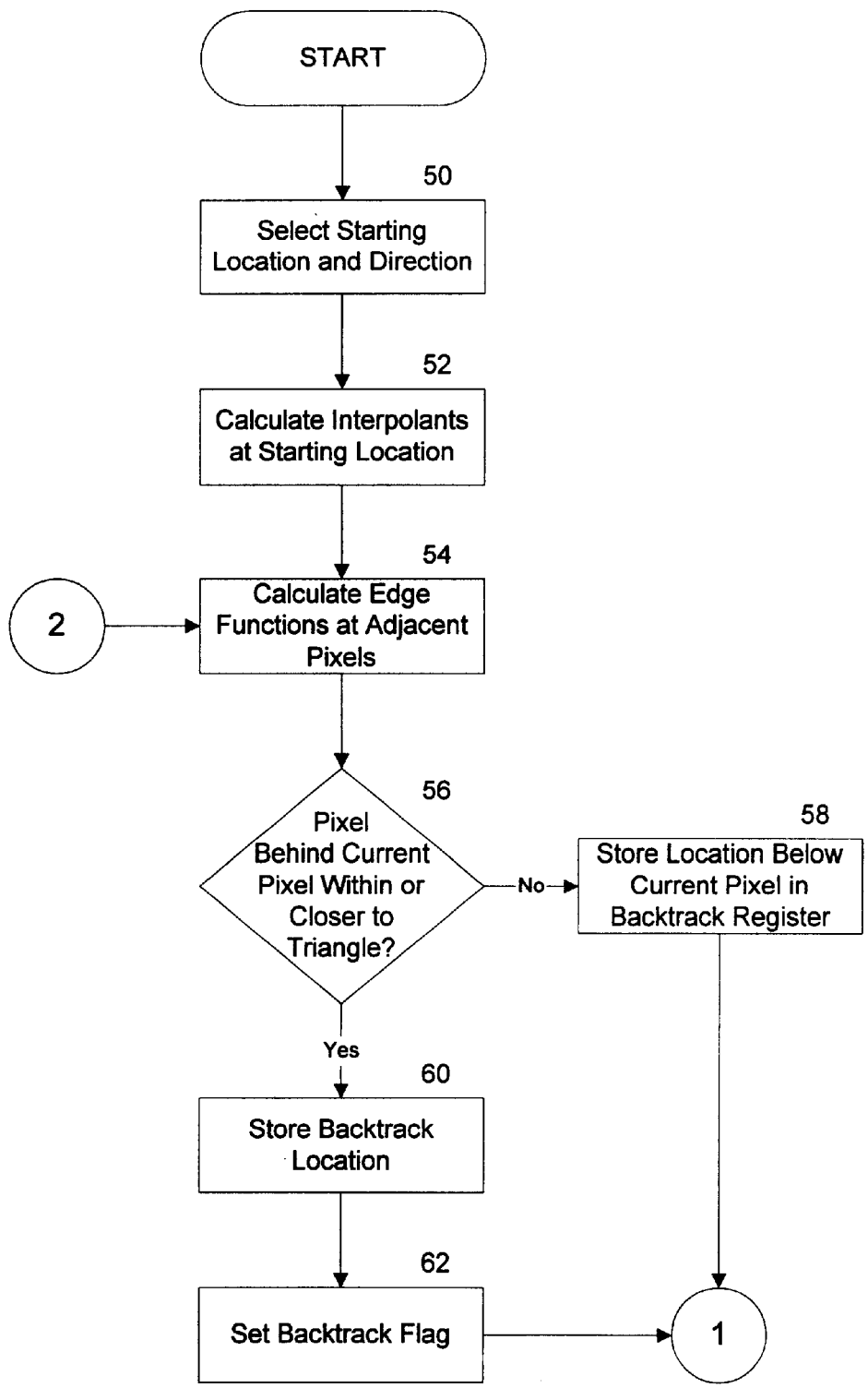
FIG. 3, comprising FIGS. 3A though 3D, is a flowchart illustrating the rasterization method implemented by the rasterization engine of the multimedia processing system.
Figure 3B:
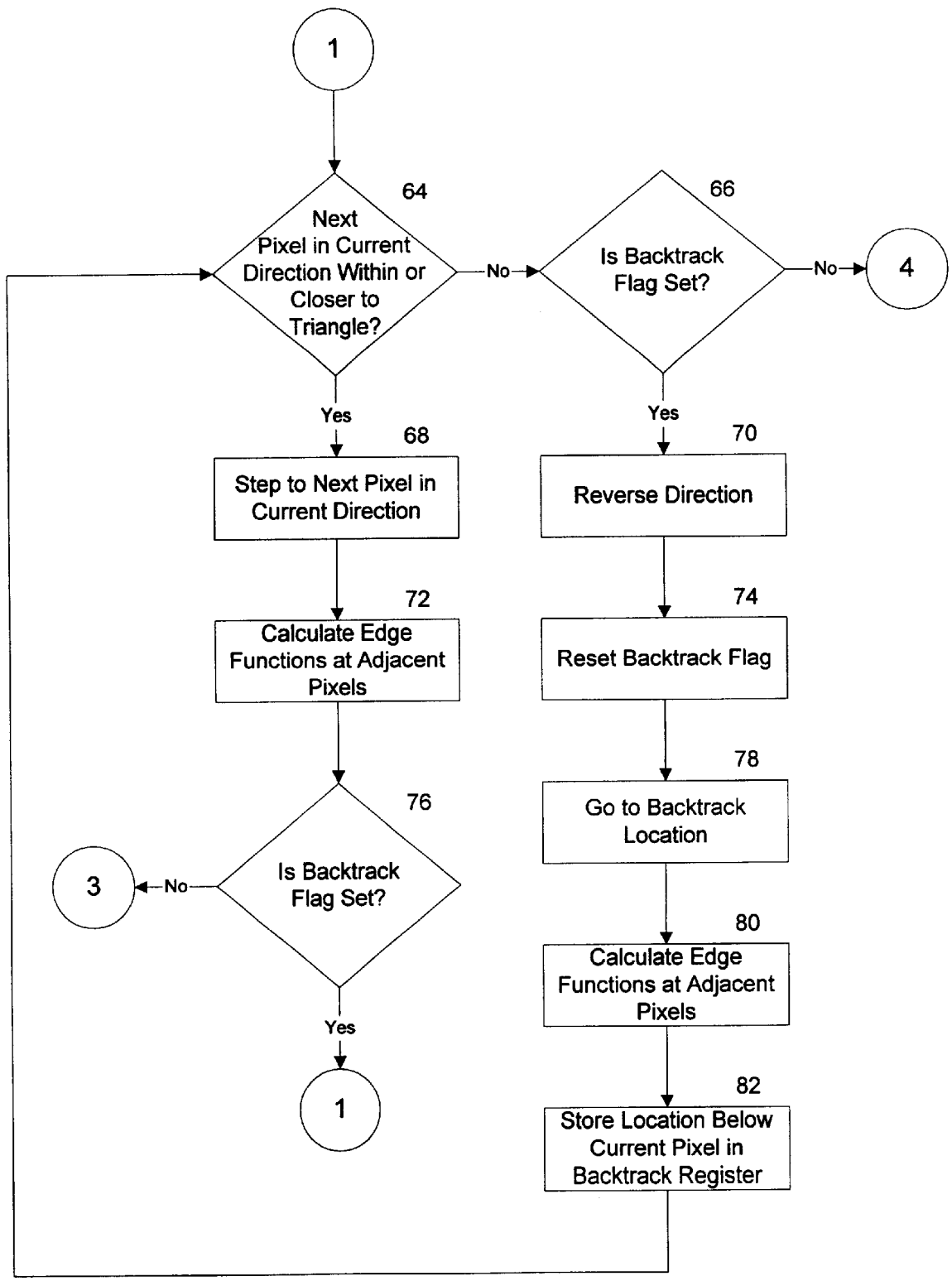
Figure 3C:
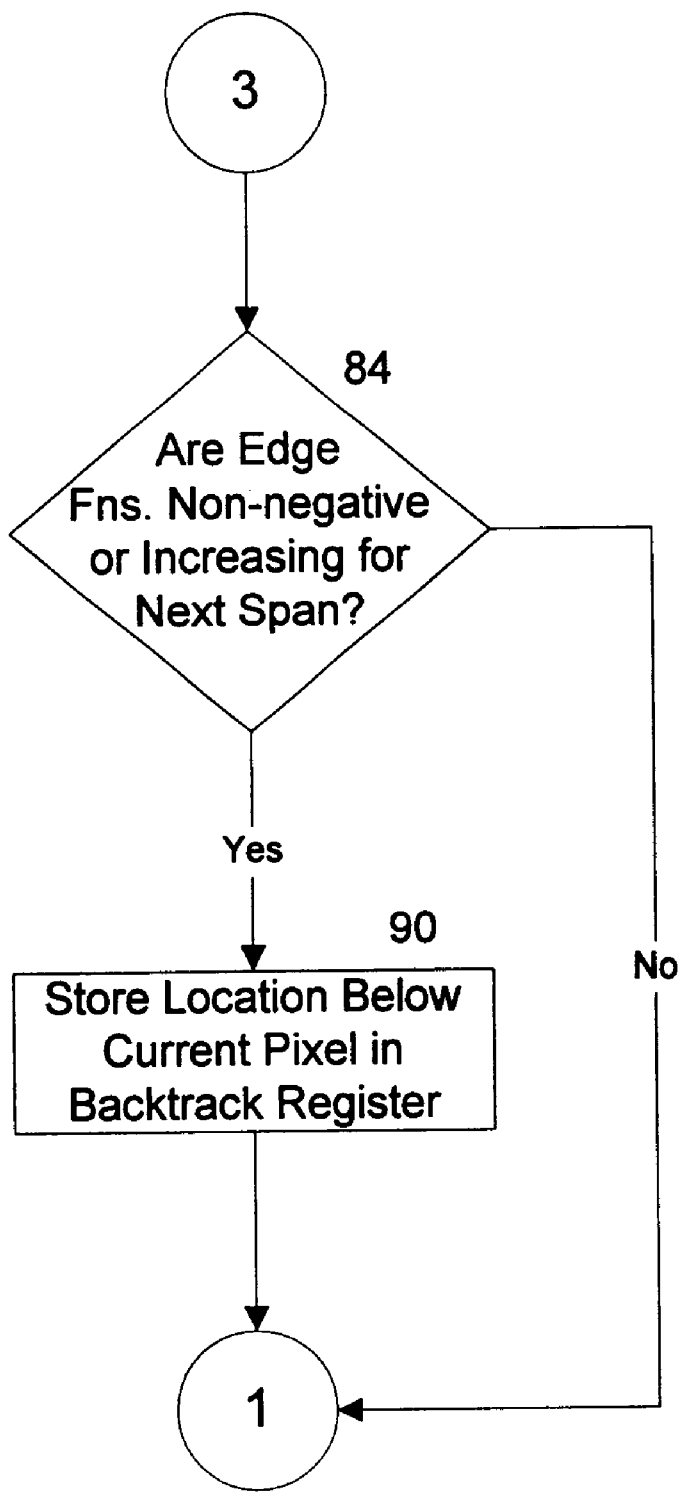
Figure 3D:
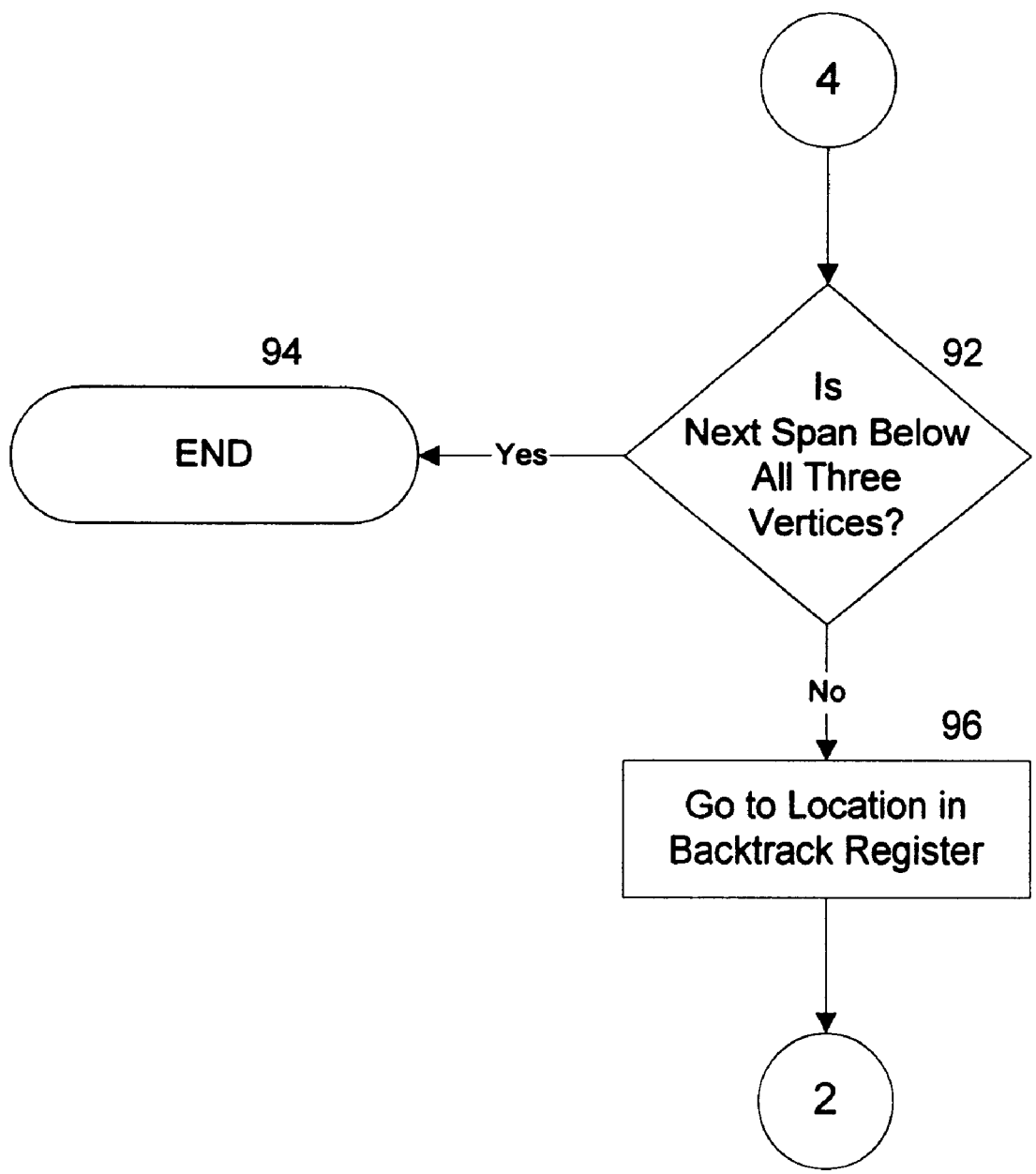

Referring to FIGS. 3A though 3D, a flowchart illustrating the rasterization method implemented by rasterization engine 32 is shown. This method assumes that values for the various interpolants described above are to be calculated at fixed x and y intervals, resulting in an array of points for which interpolant values have been calculated. This array of locations corresponds to at least a portion of the array of pixels on display system 24, and to the corresponding array of memory locations in frame buffer 20. Thus, in the following description, the term "pixel" may be used at various times to refer to an actual pixel on display system 24, a set of x- and y-coordinates in image space corresponding to that pixel, or the memory location in frame buffer 20 corresponding to that pixel. The method described herein provides an efficient means for visiting every pixel encompassed by the present image component triangle while minimizing the number of clock cycles spent calculating interpolant values for pixels outside the triangle.

The method begins at step 50, where rasterization engine 32 may choose starting coordinates and an initial scan direction (right or left) to begin the rasterization process. The starting coordinates correspond to a display pixel in display system 24 and a corresponding memory location in frame buffer 20. The starting coordinates and scan direction may be selected based upon the three vertex coordinates according to well-known algorithms. However, because the rasterization method described herein preferably progresses horizontally and downward only (i.e. in a non-decreasing y-direction), the algorithm preferably selects an initial y-coordinate value no greater than that of the highest pixel (pixel with the lowest y-value) encompassed by the triangle. The initial scan direction may be selected to maximize the efficiency of the rasterization method described herein, or may be chosen arbitrarily (for example, left-to-right).

It should be noted that rasterization unit 32, rather than choosing a set of starting coordinates, may simply use the initial coordinates provided by setup unit 30. These initial coordinates, as previously described, are provided by setup unit 30, along with initial interpolant values and partial derivatives, as a basis for calculating interpolant values anywhere in the polygon.

As will be described, the rasterization method proceeds row-by-row in a downward (increasing y) direction. A pixel row is referred to herein as a "span." It will be understood that the method described herein may readily be modified to proceed in an upward (decreasing y) direction, or column-by-column in either an increasing or a decreasing x-direction. Thus, the term "span" may alternatively be used to refer to a column of pixels.

When starting coordinates and an initial scan direction have been selected, rasterization engine 32 may, at step 52, calculate values for the various interpolants at the starting coordinates. This calculation utilizes the partial derivatives and initial coordinates calculated by setup unit 30 as previously described. Alternatively, if the initial coordinates provided by setup unit 30 were used by rasterization engine 32 as the starting coordinates at step 50 as previously described, then rasterization engine 32 may simply use the initial interpolant values, also provided by setup unit 30, as the interpolant values for the starting coordinates.

From the values of the three edge functions at the starting coordinates, rasterization engine 32 determines whether the pixel corresponding to the starting coordinates is encompassed by the image component triangle. For example, in one embodiment, if each edge function has a positive value at the starting coordinates, then the present pixel is considered to be within the triangle. If the current pixel is determined to be included in the triangle, the various interpolant values may be passed to mixing unit 36 and frame buffer 20 for additional processing.

At step 54, rasterization engine 32 calculates edge function values at two pixel locations adjacent to the present pixel location. Specifically, rasterization engine 32 calculates edge function values at the pixel locations to the left and right of the present pixel location.

At step 56, rasterization engine 32 determines whether the pixel located adjacent to the present pixel in the direction opposite the chosen scan direction is either (a) within the image component triangle or (b) closer to being inside the image component triangle than the present pixel. Thus, if the current scan direction is right-to-left, then the pixel immediately to the right of the present pixel is examined. This pixel is referred to as being "behind" the present pixel. To make this determination, rasterization engine 32 uses the values calculated at step 54 to determine, for each of the three edge functions, whether the edge function is either non-negative for this "behind" pixel or increasing in the direction opposite the current scan direction. An overall affirmative result is only obtained if all three edge functions give an affirmative result to this test. Otherwise, step 56 yields a negative result.

Upon an overall affirmative result at step 56, the method proceeds to step 60, where the location of the pixel behind the present pixel is stored in backtrack register 33. As will become apparent, this stored backtrack location will allow rasterization engine 32 to resume scanning the current span of pixels in a direction opposite the current scan direction, after an edge of the triangle is reached in the current scan direction. At step 62, a backtrack flag in backtrack register 33 is set to denote that a backtrack location in the present pixel span is stored in backtrack register 33.

Upon a negative result at step 56, the pixel location immediately below the present pixel is stored in backtrack register 33 at step 58. As will be described below, this location represents an initial estimate of the best location to begin scanning the next span of pixels, after the current span of pixels is exhausted. This location can be stored in backtrack register 33 because backtrack register 33 is not needed to store a backtrack location within the present span of pixels.

After either step 58 or step 62 is completed, the method proceeds to step 64, where rasterization engine 32 determines whether the pixel adjacent to the present pixel in the current scan direction is either within the image component triangle or closer to being inside the image component triangle than the present pixel. This pixel is referred to herein as the "next" pixel in the scan direction. Again, the determination of whether this pixel is within the triangle is made by examining the edge function values at the pixel location to determine, for each of the three edge functions, whether the edge function is either non-negative for this "next" pixel or increasing in the current scan direction. An overall affirmative result is only obtained if all three edge functions give an affirmative result to this test. If a negative result is obtained, scanning in the present scan direction is typically halted and a new scan location and direction are selected. This procedure, which begins at step 66, will be described more fully below.

Upon an overall affirmative result at step 64, the method proceeds to step 68, where the "next" pixel becomes the present pixel. Interpolant values (colors, transparency, texture coordinates, etc.) are calculated for this new current pixel. At step 72, edge function values are calculated at two adjacent pixel locations. Specifically, edge function values are calculated for the pixel immediately "ahead" of the current pixel in the current scan direction, and for the pixel immediately below the current pixel (i.e. in the next span).

At step 76, a determination is made whether the backtrack flag in backtrack register 33 is set. An affirmative result indicates that a backtrack location is stored in backtrack register 33, and that backtrack register 33 should therefore be left untouched at this point. However, a negative result indicates that no backtrack location is stored in backtrack register 33, and that the information in backtrack register 33 may therefore be updated if circumstances warrant.

Thus, upon an affirmative result at step 76, the method returns to step 64, to continue scanning in the present scan direction, as previously described. Upon a negative result at step 76, the method proceeds to step 84, where rasterization engine 32 determines, for each of the three edge functions, whether the edge function is either non-negative for the pixel immediately below the present pixel or increasing in the current scan direction. An overall affirmative result is only obtained if all three edge functions give an affirmative result to this test. Upon an overall affirmative result, backtrack register 33 is updated with the location of the pixel location immediately below the present pixel at step 90. The method then returns to step 64 to continue scanning in the present scan direction, as previously described. Upon a negative result at step 84, backtrack register 33 is left unchanged, and the method returns to step 64.

Returning to step 64, a negative result indicates that scanning in the current scan direction should generally be halted, as previously described. Thus, upon a negative result, the method proceeds to step 66, where rasterization engine 32 determines whether the backtrack flag in backtrack register 33 is set. An affirmative result indicates that the present span has not yet been exhausted. Thus, upon an affirmative result, the method proceeds to step 70, where the scan direction is reversed. At step 74, the backtrack flag is reset. At step 78, the backtrack location stored in backtrack register 33 is assumed as the present pixel location, and interpolant values are calculated for this pixel. At step 80, edge function values are calculated for two adjacent pixel locations. Specifically, edge function values are calculated for the pixel immediately "ahead" of the current pixel in the current scan direction, and for the pixel immediately below the current pixel (i.e. in the next span). At step 82, the location immediately below the present pixel is stored in backtrack register 82 as an initial estimate of the best location to begin scanning the next span. The method then returns to step 64.

Upon a negative result at step 66, a procedure is initiated beginning at step 92 to determine whether the entire image component triangle has been scanned, or whether scanning should continue on the next span. Thus, at step 92, rasterization engine 32 determines whether the location stored in backtrack register 33 is below (i.e. has greater y-coordinate value than) all three vertices of the triangle, indicating that rasterization of the triangle is complete. Upon a negative result, the location stored in backtrack register, representing a preferred location to begin scanning of the next span, is assumed as the new present pixel location at step 96, and scanning the triangle is continued in the new span at step 54. Upon an affirmative result at step 92, the method ends at step 94.

Figure 4:
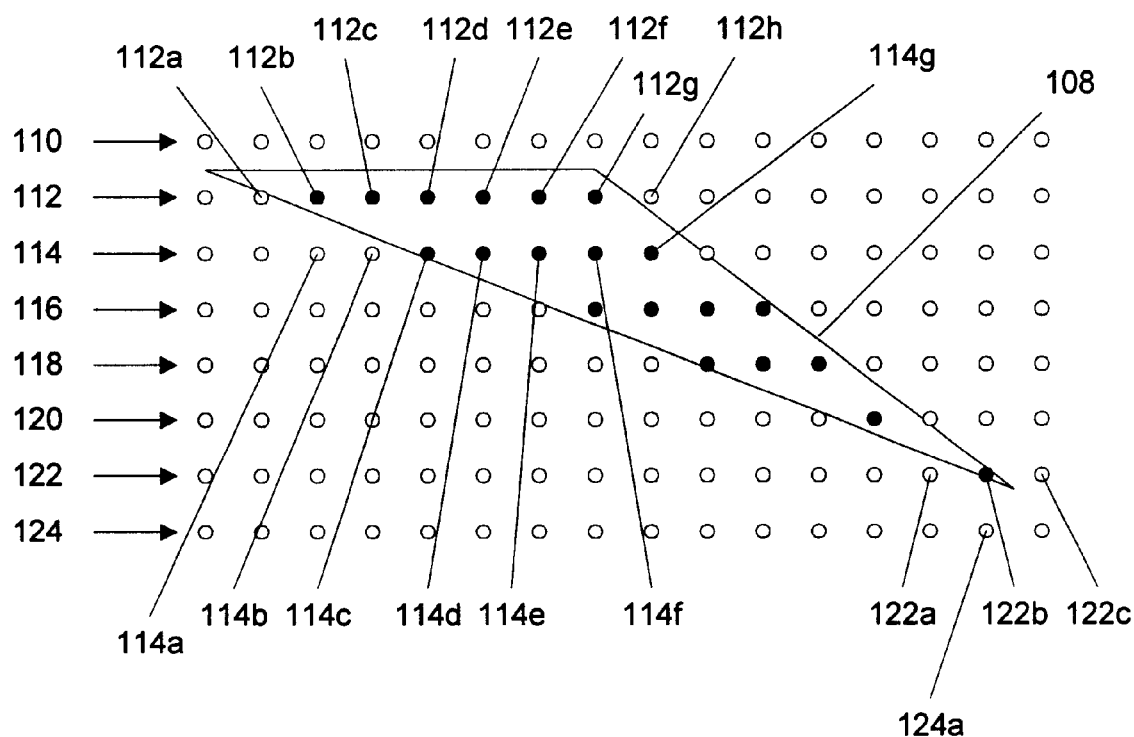
FIG. 4 is a diagram of an exemplary image component triangle for processing by the multimedia processing system.

The rasterization method described above is further illustrated by reference to an exemplary image component triangle 108 shown in FIG. 4. A plurality of spans 110 through 124 of pixels are illustrated superimposed on triangle 108, with each solid (filled) circle representing the center of a pixel which is within the bounds of triangle 108, and each unfilled circle representing the center of a pixel which is outside triangle 108.

An exemplary rasterization procedure for triangle 108 in accordance with the invention will be described. Selected steps which have been sufficiently described above will be omitted from the description of this exemplary procedure. In this description, pixel 112*b* is assumed to have been selected as the starting pixel, and an initial scan direction of left-to-right is assumed to have been chosen. As previously described, the starting pixel and initial scan direction are preferably chosen so that no higher pixel than the starting pixel is within the bounds of triangle 108. This selection occurs at step 50 in FIG. 3.

At step 56, rasterization engine 32 determines that pixel 112*a* is outside triangle 108. Rasterization engine 32 therefore stores the location of pixel 114*a* in backtrack register 33 at step 58. At step 64, rasterization engine 32 determines that pixel 112c is within triangle 108. Pixel 112c therefore becomes the current pixel at step 68. Since the backtrack flag in backtrack register 33 has not been set, the method proceeds to step 84. Although pixel 114b is not within triangle 108, rasterization engine 32 determines at step 84 each edge function is either non-negative at pixel 114b or increasing in the current scan direction. The location of pixel 114b is therefore stored in backtrack register 33 at step 90.

This process continues for each pixel 112d through 112g, with each successive pixel 114c through 114f being stored in backtrack register 33. At step 64, rasterization engine 32 determines that pixel 112h is not within triangle 108. Since the backtrack flag is not set, the method proceeds to step 92, where rasterization engine 32 determines that span 114 is not below all three vertices of triangle 108. Scanning therefore continues from pixel 114f, which is the location stored in backtrack register 33, in a left-to-right direction.

At step 56, rasterization engine 32 determines that pixel 114e is within triangle 108. The location of pixel 114e is therefore stored in backtrack register 33. After rasterization engine 32 reaches pixel 114g and determines that no more pixels to the right within span 114 are within triangle 108, rasterization engine 32 backtracks to pixel 114e and begins scanning in a right-to-left direction.

In this manner, the scanning of triangle 108 continues through spans 116, 118, 120 and 122. When pixel 122b is reached, rasterization engine 32 determines at steps 64 and 66 that pixel 122c is outside triangle 108, and that the backtrack flag is not set. Rasterization engine 32 then proceeds to step 92, where it is determined that the pixel currently stored in backtrack register 33, pixel 124a, is below all three vertices of triangle 108. Thus, the method ends at step 94.

The rasterization method described above provides an efficient process for determining which pixels are within an image component polygon, and for calculating interpolant values for those pixels which are within the image component polygon. For each pixel span, the method uses backtrack register 33 to store an estimated best point to begin scanning the next pixel span. This method therefore reduces the amount of scanning of pixels outside the image component polygon, thereby reducing image rendering time. Furthermore, by using an existing register for this purpose, the method increases image rendering speed without a corresponding increase in the number of logic gates or the amount of chip area required for the rasterization engine.

Although the present invention and its advantages have been described in detail, it should be understood that various changes, substitutions, and alterations can be made therein without departing from the spirit and scope of the invention as defined by the appended claims.

We claim:

1. A method for displaying an image component polygon, comprising:

receiving information indicating a location of a perimeter of the image component polygon;

selecting a current pixel span comprising a plurality of pixels;

selecting a current scan direction for the current pixel span;

storing a location to begin scanning a subsequently pixel span, the location being determined during scanning of the current pixel span;

scanning at least one pixel in the current pixel span in the current scan direction to determine whether the pixel is within the image component polygon;

determining image values for each pixel in the current pixel span in the current scan direction that is determined to be within the image component polygon;

storing the image values in a frame buffer for display; and scanning the subsequent pixel span from the stored location after each pixel in the current pixel span has been scanned.

2. The method of claim 1, further comprising displaying an image on a display system utilizing the image values stored in the frame buffer.

3. The method of claim 1, further comprising:

determining whether a portion of the current pixel span remains to be scanned in a direction opposite the current scan direction; and storing a backtrack location in response to a determination that a portion of the current pixel span remains to be scanned in the direction opposite the current scan direction;

wherein storing a location to begin scanning a subsequent pixel span is performed in response to a determination that no portion of the current pixel span remains to be scanned in the direction opposite the current scan direction.

4. The method of claim 3, further comprising:

determining whether a backtrack location is stored upon reaching a pixel in the current pixel span that is not within the image component polygon;

reversing the current scan direction in response to a determination that a backtrack location is stored;

reading the backtrack location in response to a determination that a backtrack location is stored; and scanning the current pixel span from the backtrack location in the current scan direction in response to a determination that a backtrack location is stored.

5. The method of claim 3, further comprising:

determining whether a backtrack location is stored upon reaching a pixel in the current pixel span that is not within the image component polygon; and scanning the subsequent pixel span from the stored location in response to a determination that a backtrack location is not stored.

6. The method of claim 1, wherein receiving information indicating the location of the perimeter of the image component polygon comprises receiving parameters for a plurality of edge functions of the image component polygon.

7. The method of claim 6, wherein determining image values for each pixel comprises interpolating image values received for each vertex of the image component polygon.

8. The method of claim 3, wherein determining whether a portion of the current pixel span remains to be scanned in the direction opposite the current scan direction comprises determining whether a backtrack location representing a pixel adjacent to a current location in the direction opposite the current scan direction is either within the image component polygon or closer to being inside the image component polygon than the current location.

9. A method for displaying an image component polygon, comprising:

a) receiving information indicating a location of a perimeter of the image component polygon;

b) selecting a current span of pixels;

c) selecting a starting pixel in the current span of pixels as a current pixel;

d) selecting a scan direction;

e) determining whether a backtrack location representing a display pixel adjacent to the current location in a direction opposite the current scan direction is either within the image component polygon or closer to being inside the image component polygon than the current location;

f) storing the backtrack location in a backtrack register in response to the backtrack location being either within the image component polygon or closer to being inside the image component polygon than the current location;

g) setting a backtrack flag in response to the backtrack location being either within the image component polygon or closer to being inside the image component polygon than the current location;

h) assuming as the current pixel each successive pixel in the current span of pixels in the scan direction, until the perimeter of the image component polygon is reached;

i) updating the backtrack register with a location of a starting pixel in a next span of pixels in response to the backtrack flag not being set;

j) in response to the backtrack flag being set and the perimeter of the image component polygon being reached, reversing the scan direction, resetting the backtrack flag and assuming as the current pixel a pixel associated with the backtrack location stored in the backtrack register;

k) in response to the backtrack flag being reset and the perimeter of the image component polygon being reached, assuming as the current span pixels the next span of pixels and assuming as the current pixel the starting pixel in the next span of pixels; and l) repeating steps (e) through (k).

10. The method of claim 9, further comprising ending the repetition of steps (e) through (k) in response to the backtrack flag being reset, the perimeter of the image component polygon being reached, and the next span of pixels being outside the image component polygon.

11. The method of claim 9, further comprising calculating values of interpolants at each successive current pixel.

12. The method of claim 11, further comprising calculating partial derivatives and initial values of interpolant functions to assist the calculation of interpolant values at each successive current pixel.

13. The method of claim 9, wherein determining whether the backtrack location is within the image component polygon comprises:

determining an edge function for each one of a plurality of edges of the image component polygon, the edge function having a first value range on a side of the edge that is partially within the image component polygon, the edge function having a second value range on a side of the edge that is entirely outside the image component polygon;

calculating an edge function value at the backtrack location for each edge of the image component polygon; and determining, for each edge function, whether either the corresponding edge function value is outside the second value range or the edge function is increasing in the scan direction.

14. A graphics processing system comprising:

an initial processing system operable to receive a command to render an image component polygon, and operable to generate parameters for calculating image values for the image component polygon;

a backtrack register operable to store a pixel location;

a rasterization engine operable to scan a pixel span in a selected direction, and operable to determine, during the selected direction scan, whether the pixel span is to be scanned in a direction opposite the selected direction, and operable to store a backtrack location in the backtrack register in response to a determination that the pixel span is to be scanned in a direction opposite the selected direction, and operable to store a location to begin scanning a subsequent pixel span in the backtrack register in response to a determination that a backtrack location is not stored in the backtrack register, and operable to calculate image values for each pixel in the pixel span in the current span direction; and a pixel data processing system operable to receive the image values from the rasterization engine, and operable to store the image values in a frame buffer for display.

15. The graphics processing system of claim 14, wherein the initial processing system comprises a setup unit operable to calculate partial derivatives and initial values of interpolant functions from which image values are to be calculated.

16. The graphics processing system of claim 15, wherein the initial processing system further comprises a front-end processor operable to receive the command to render the image component polygon, and operable to receive parameters associated with the image component polygon, and operable to convert any variable format parameters to canonical format parameters, and operable to provide the canonical format parameters to the setup unit.

17. The graphics processing system of claim 14, wherein the image values calculated by the rasterization engine include texture coordinates and color values, and wherein the pixel data processing system comprises:

a texture unit operable to receive the texture coordinates from the rasterization engine, and operable to look up a texture value from a texture map using the texture coordinates; and a mixing unit operable to receive the texture value from the texture unit, and operable to receive the color values from the rasterization engine, and operable to combine at least the texture value and the color values to determine a final color value.

18. The graphics processing system of claim 17, wherein the color values include diffuse and specular color values, and wherein the image values calculated by the rasterization engine further include a fog value, and wherein the mixing unit is further operable to combine at least the diffuse and specular color values, the fog value and the texture value to determine the final color value.

* * * * *